US010802192B2

(12) United States Patent
Flynn

(10) Patent No.: US 10,802,192 B2
(45) Date of Patent: Oct. 13, 2020

(54) COLLIMATING APPARATUS

(71) Applicant: InnerScene Inc., Quedgeley, Gloucestershire (GB)

(72) Inventor: Sean Flynn, Quedgeley (GB)

(73) Assignee: INNERSCENE, INC., Gloucester (GB)

( * ) Notice: Subject to any disclaimer, the term of this patent is extended or adjusted under 35 U.S.C. 154(b) by 0 days.

(21) Appl. No.: 16/172,676

(22) Filed: Oct. 26, 2018

(65) Prior Publication Data

US 2019/0129084 A1    May 2, 2019

(30) Foreign Application Priority Data

Oct. 27, 2017    (GB) .................................. 1717723.9

(51) Int. Cl.
| | |
|---|---|
| *F21V 7/00* | (2006.01) |
| *F21V 8/00* | (2006.01) |
| *F21V 5/02* | (2006.01) |
| *F21V 5/04* | (2006.01) |
| *F21V 5/00* | (2018.01) |
| *F21V 13/04* | (2006.01) |
| *F21V 7/06* | (2006.01) |
| *F21Y 115/10* | (2016.01) |

(52) U.S. Cl.
CPC ............ *G02B 6/0008* (2013.01); *F21V 5/007* (2013.01); *F21V 5/008* (2013.01); *F21V 5/02* (2013.01); *F21V 5/045* (2013.01); *F21V 7/00* (2013.01); *F21V 7/06* (2013.01); *F21V 13/04* (2013.01); *G02B 6/0006* (2013.01); *F21V 5/005* (2013.01); *F21Y 2115/10* (2016.08)

(58) Field of Classification Search
CPC ................ F21S 8/026; F21V 5/00–048; F21V 7/00–0091; F21V 13/00–14; G02B 6/00–0031; G02B 27/30
USPC ................ 362/298–309, 326–340, 551–561, 362/600–634
See application file for complete search history.

(56) References Cited

U.S. PATENT DOCUMENTS

| | | | | |
|---|---|---|---|---|
| 2003/0002296 A1* | 1/2003 | Steiner | ................. | G02B 6/0006 362/560 |
| 2004/0246391 A1* | 12/2004 | Travis | ................ | G02B 27/0081 349/6 |
| 2005/0259441 A1* | 11/2005 | Arai | ..................... | G02B 6/0028 362/613 |

(Continued)

FOREIGN PATENT DOCUMENTS

| | | |
|---|---|---|
| CN | 105891968 A | 8/2016 |
| CN | 107085264 A | 8/2017 |

(Continued)

*Primary Examiner* — Jason M Han
(74) *Attorney, Agent, or Firm* — Umberg Zipser LLP

(57) ABSTRACT

The present invention describes a collimating apparatus 10. The collimating apparatus 10 comprises a light source 12, a waveguide 14 adjacent to the light source 12 and configured to receive light from the light source 12, a light steering optic 16 configured to receive light 30 from the waveguide 14, and a collimating optic 18 configured to collimate light received from the light steering optic 16. The wave guide 14 and the collimating optic 18 are both physically located on a first side of the light steering optic 16. The light steering optic 16 is configured to steer the light 30 received from the waveguide 14 towards the collimating optic 18.

17 Claims, 15 Drawing Sheets

(56) References Cited

U.S. PATENT DOCUMENTS

2008/0158641 A1\* 7/2008 Lieb .................. G02B 6/0046
359/263
2017/0090180 A1 3/2017 Ehrhardt et al.

FOREIGN PATENT DOCUMENTS

| WO | 2009099547 A3 | 11/2009 |
| WO | 2012168870 A1 | 12/2012 |
| WO | 2017048569 A1 | 3/2017 |

\* cited by examiner

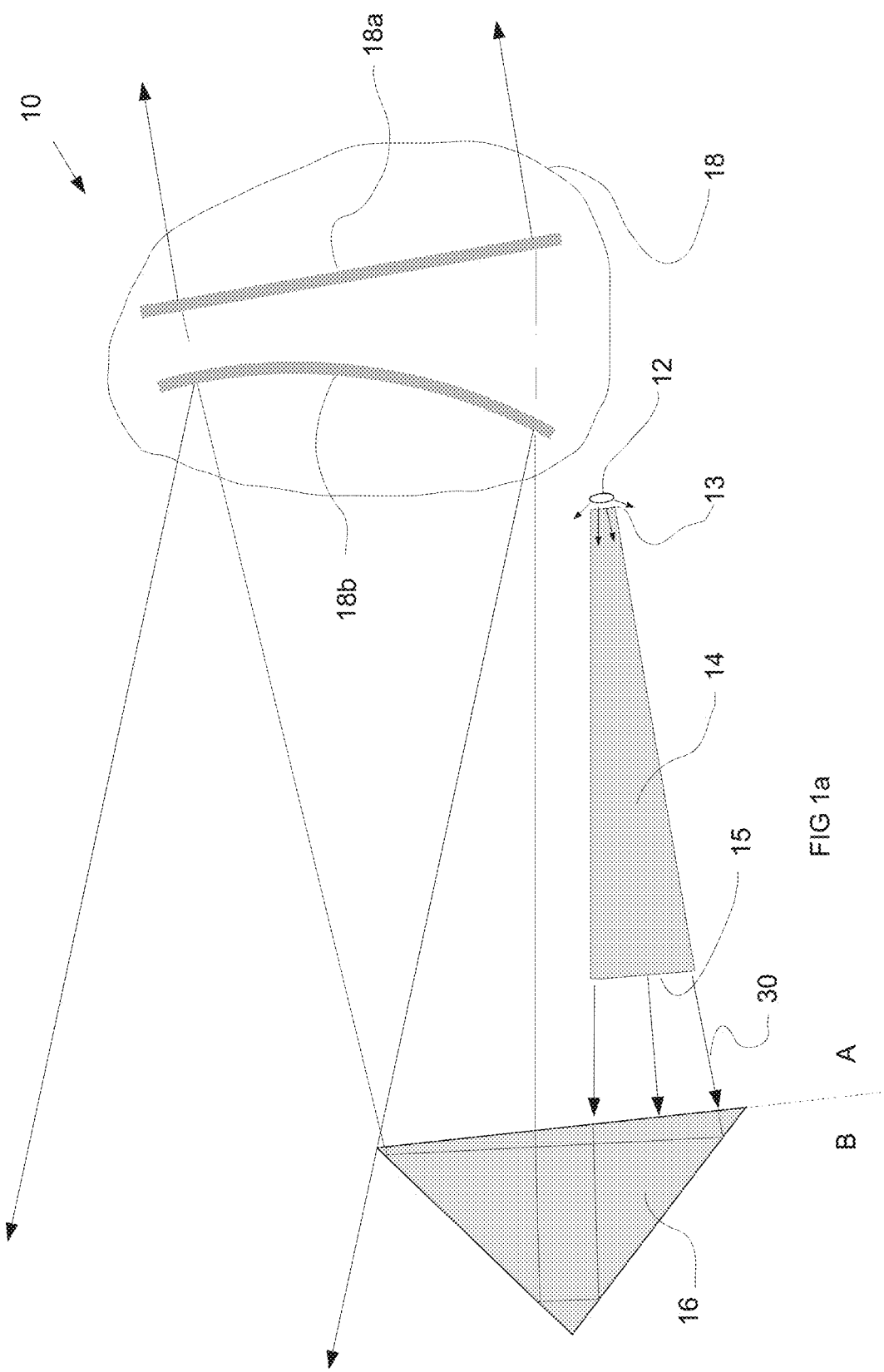

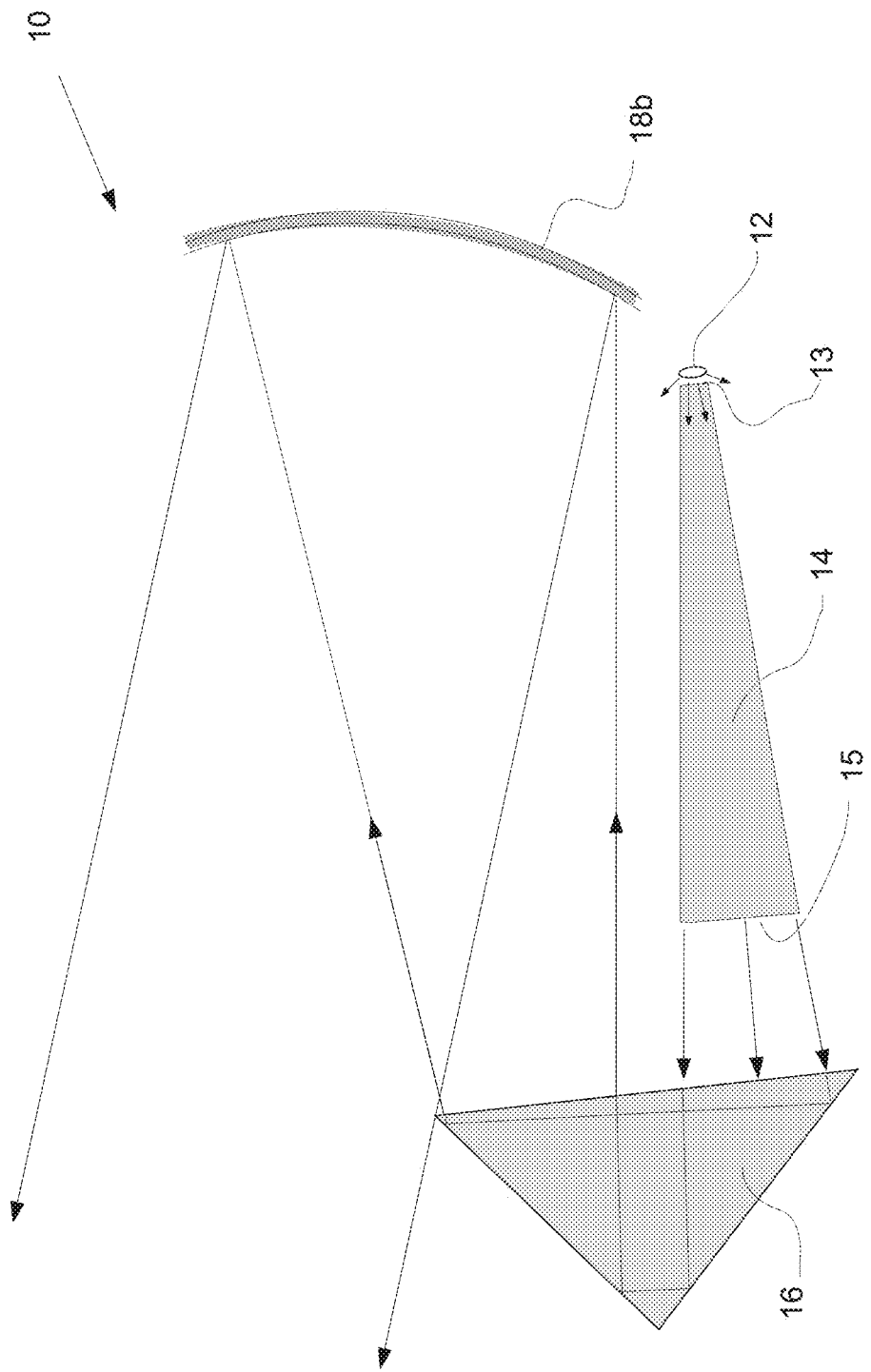

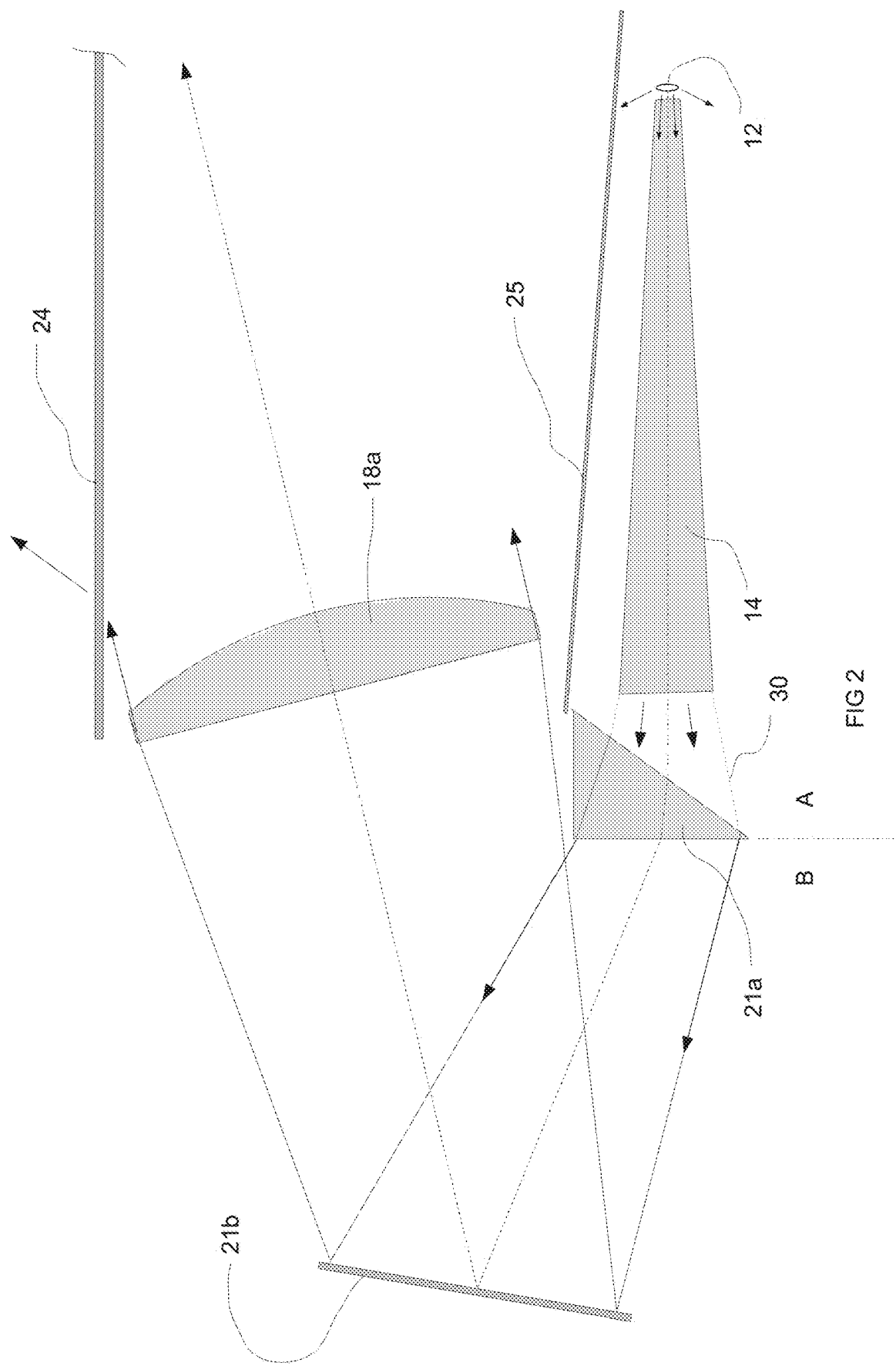

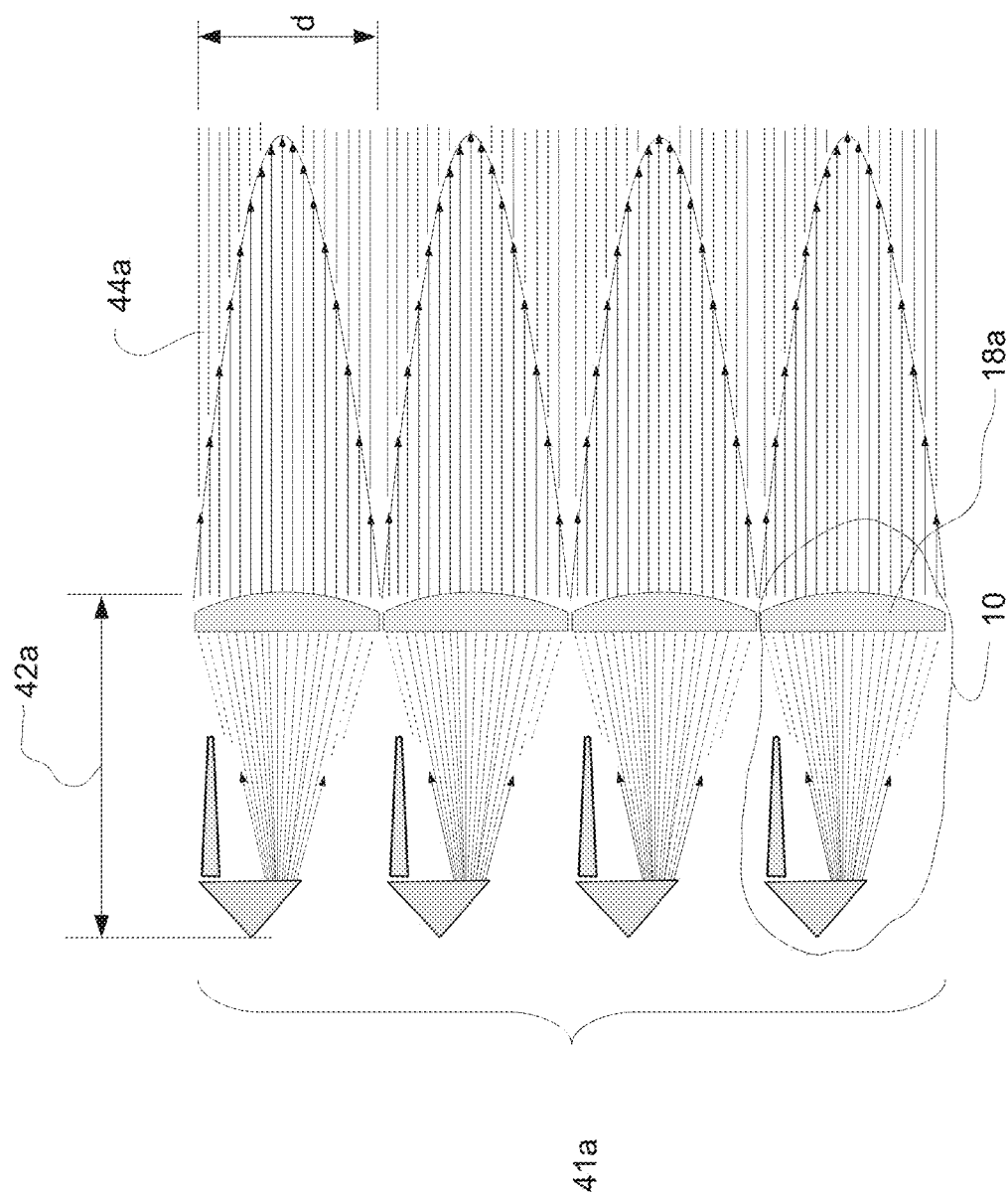

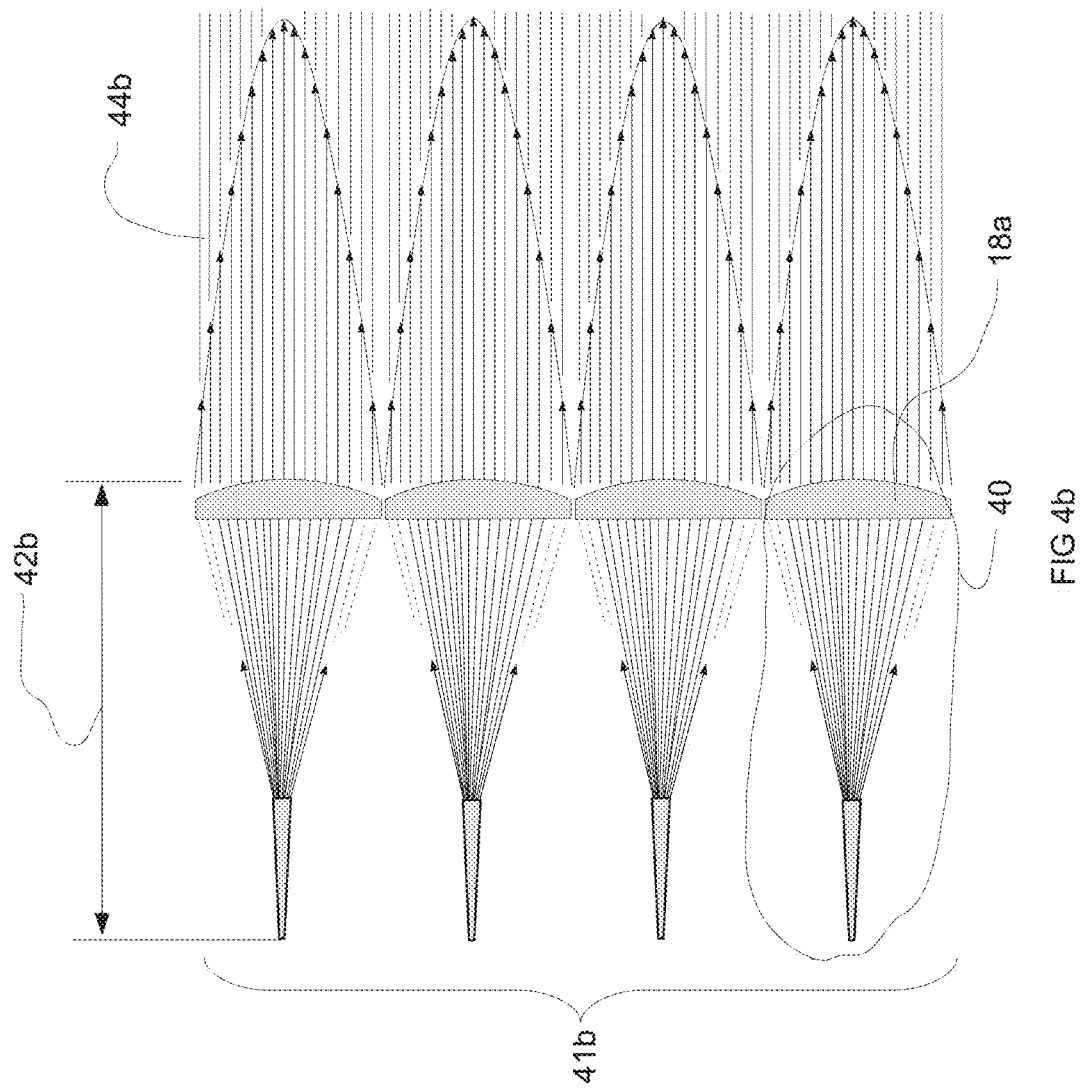

Relative radiance $(R_r) = A_1 \cdot \sin\alpha_1 / A_2 \cdot \sin\alpha_2$

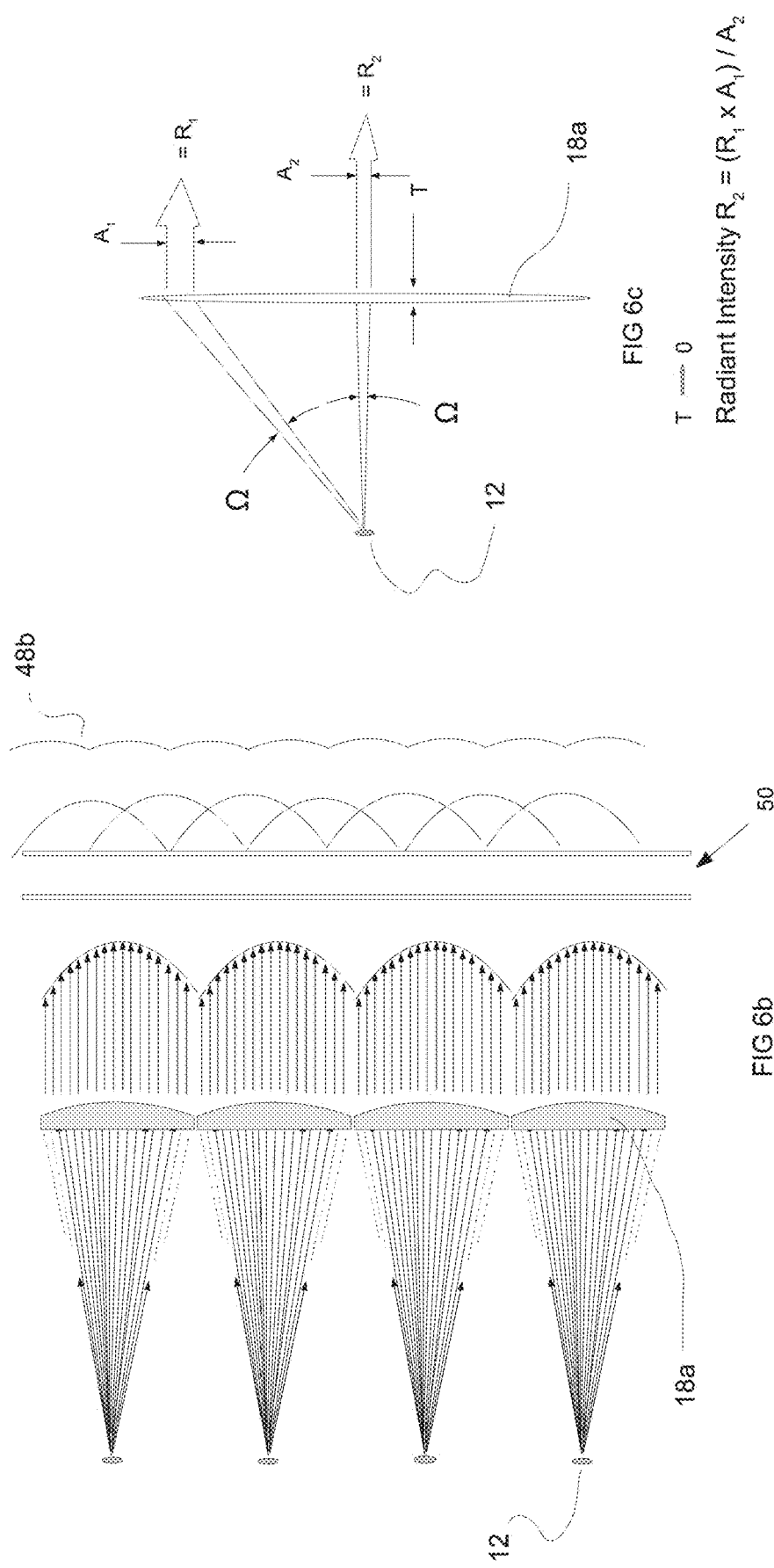

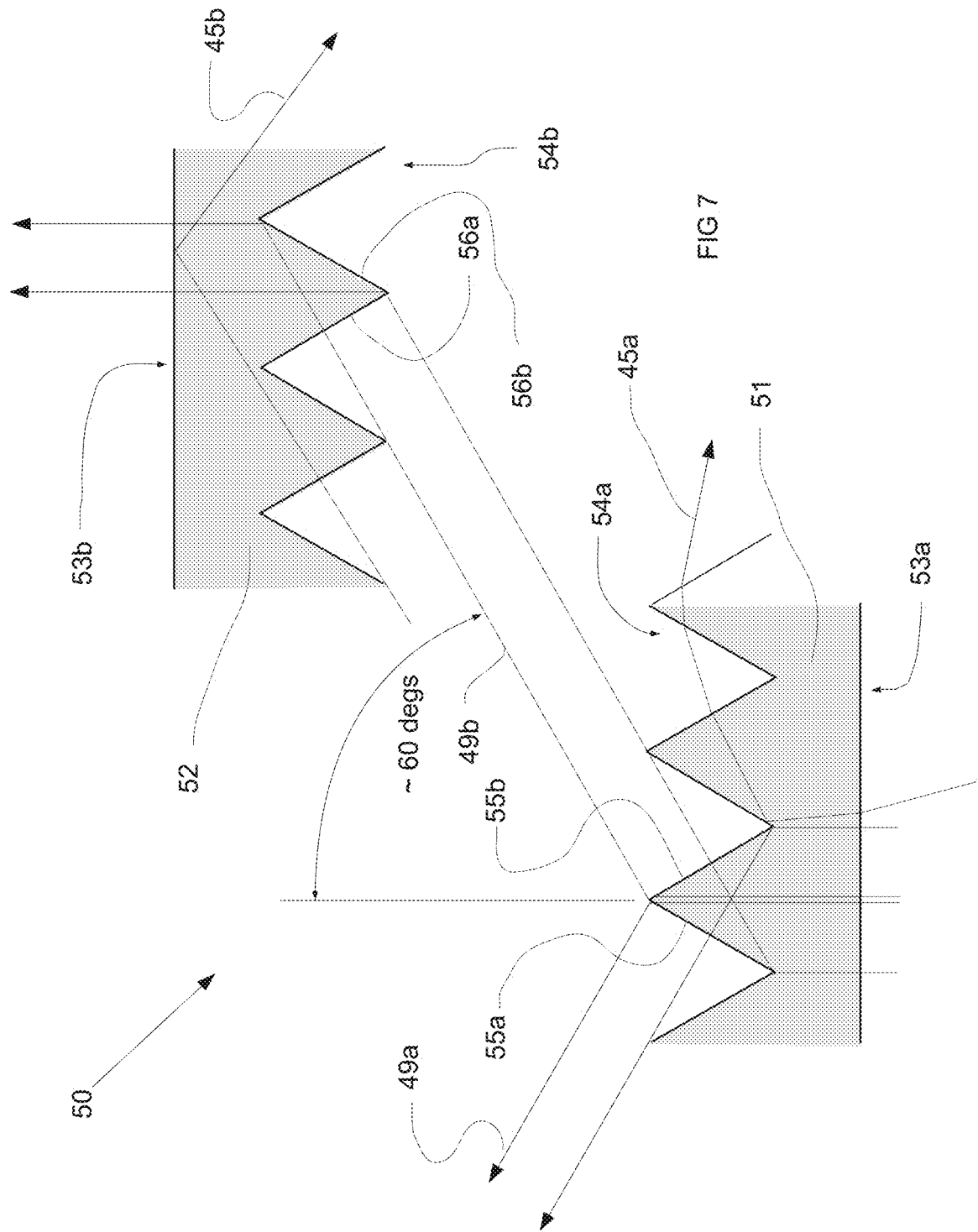

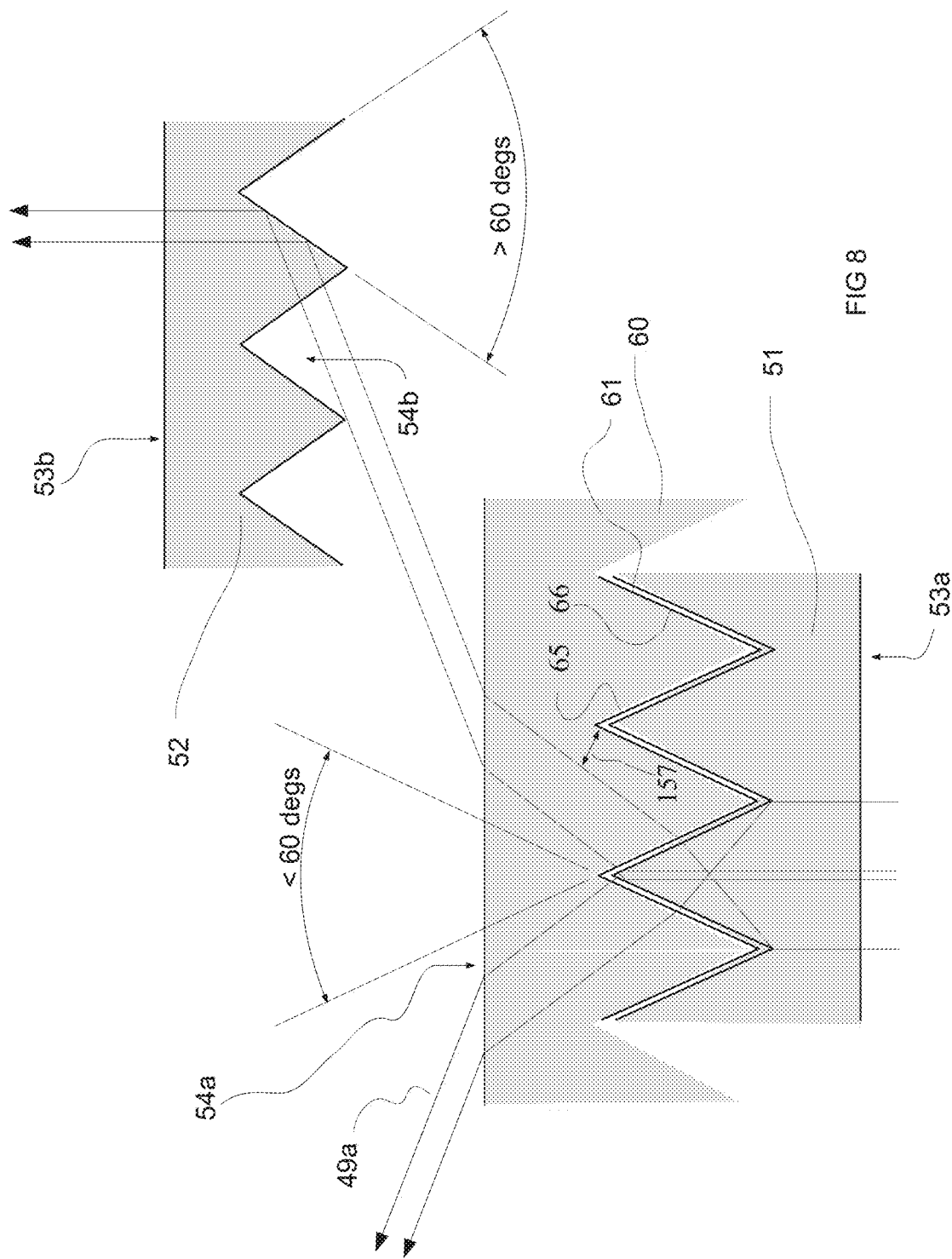

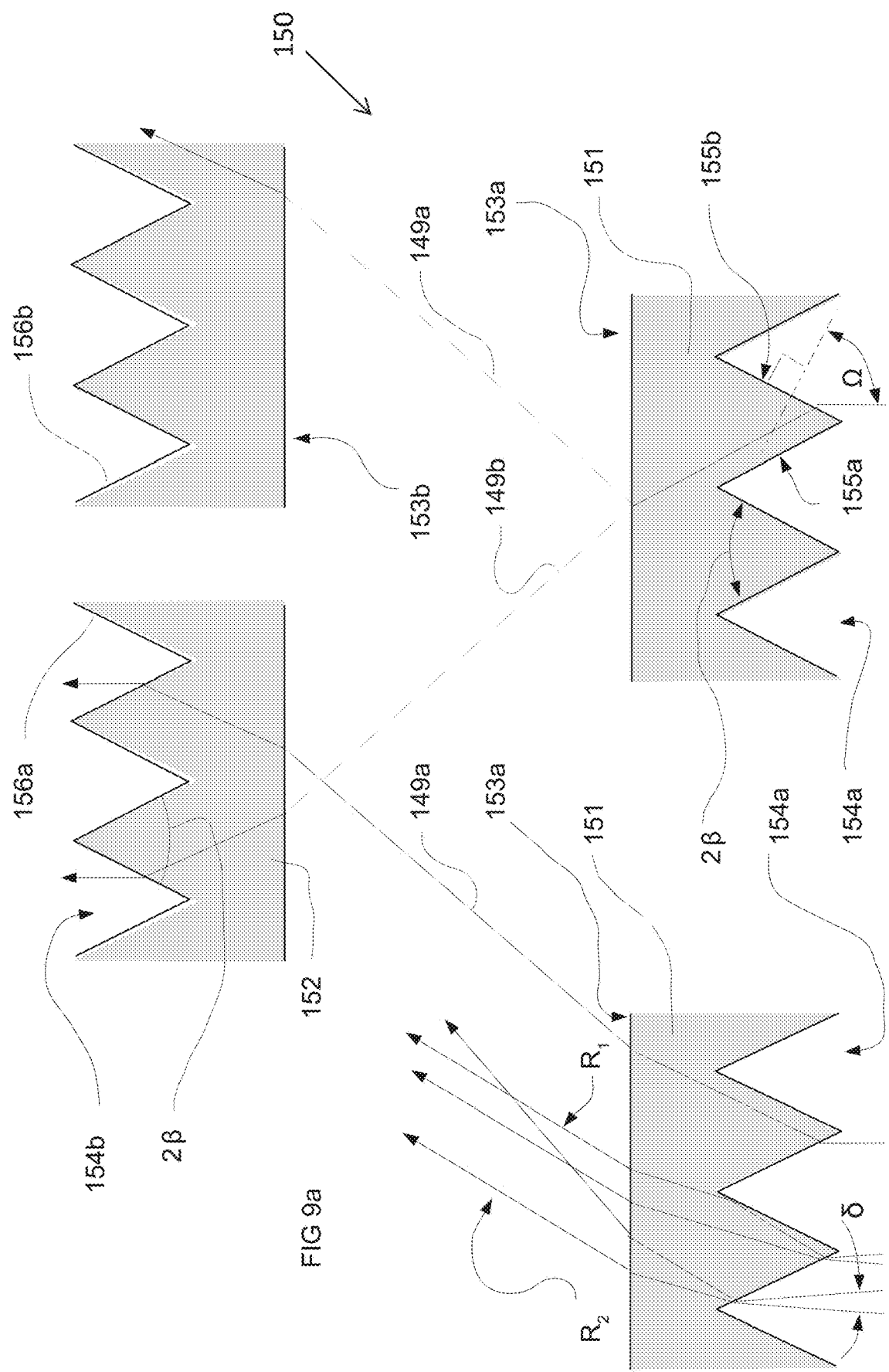

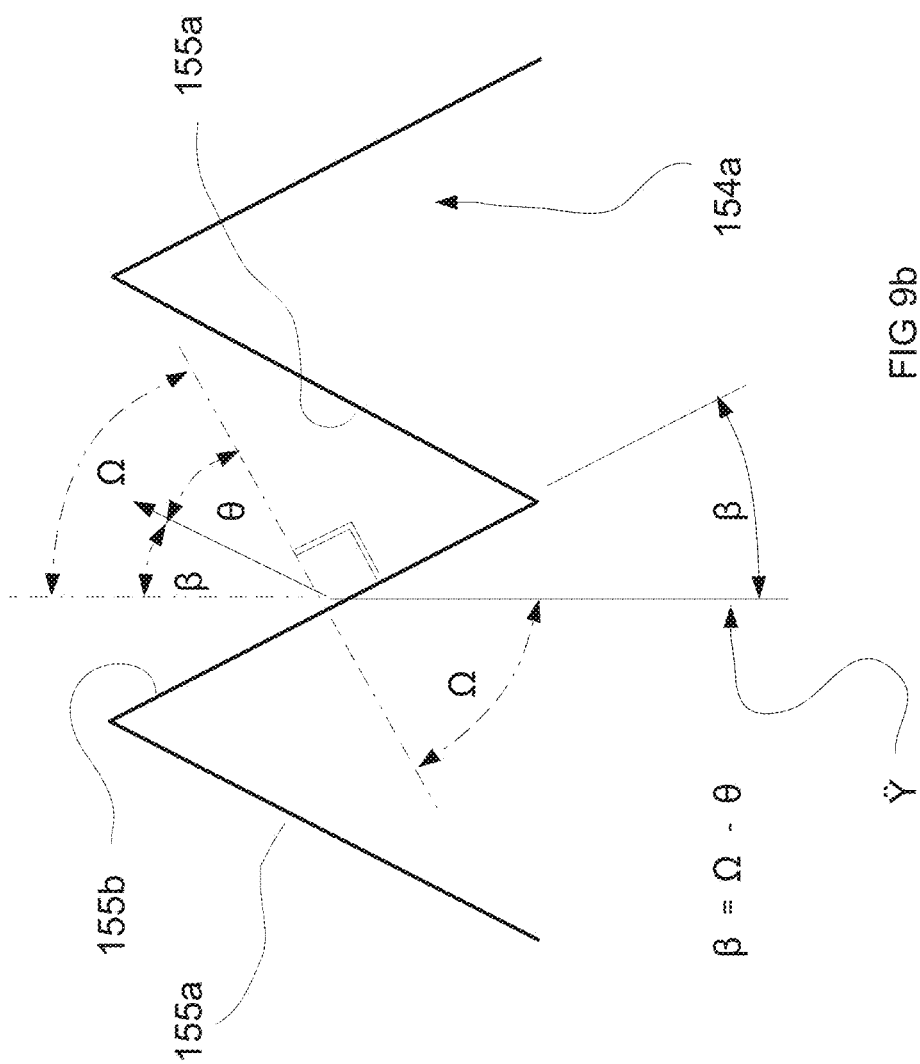

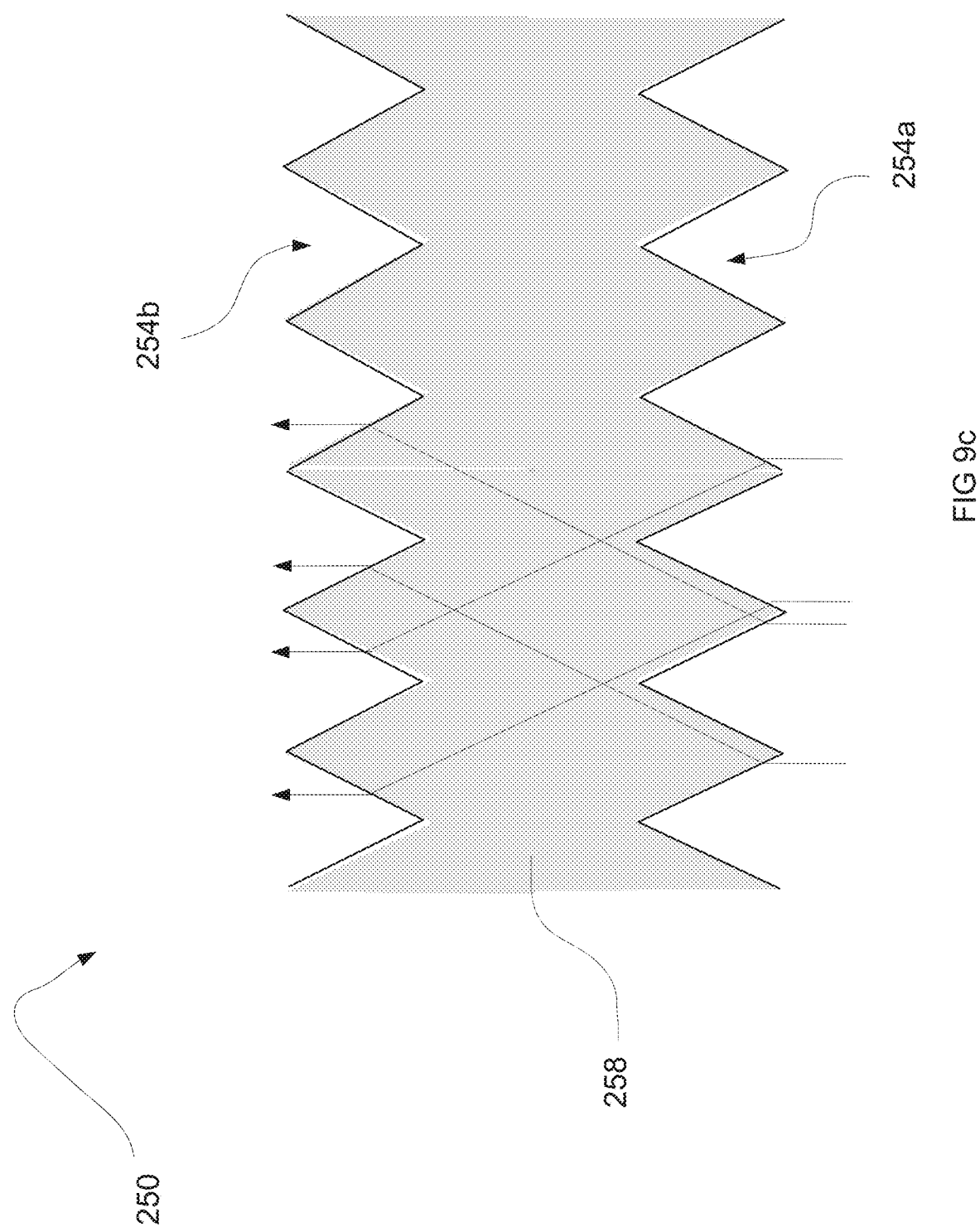

COLLIMATING APPARATUS

FIELD OF INVENTION

The present invention relates to a collimating apparatus, and an artificial skylight comprising said collimating apparatus. Such artificial skylights are used to generate a realistic appearance of a sky comprising a virtual sun set at infinity. The present invention also relates to an array, and particularly an artificial skylight comprising said array.

BACKGROUND OF INVENTION

Partial collimation of a bright point light source, for example a Light Emitting Diode (LED) or High Intensity Discharge (HID) lighting, is generally achieved using in-line optics usually consisting of a lens or a reflector. Hand torch lights and car headlights often use parabolic reflectors, convergent lenses or a combination of the two. Spot lights such as those found in ceilings tend to use total internal reflection optics using a solid parabolic lens made of polymethyl methacrylate or glass.

In the case of a car headlight, limitations exist as to how large the partially collimated beam can be made. A large headlight requires commensurately sized collimating optics and as its aperture size increases it becomes deeper, thereby intruding into the under bonnet space which is generally quite limited.

A virtual or artificial skylight is similarly constrained in that its depth dictates the spaces into which it can fit. A skylight of shallow depth can conceivably fit into more ceiling spaces than a deeper one. The Applicant's International Patent application number WO2017048569 describes a compact artificial skylight which can be installed within a typical ceiling cavity such that they can be installed in office spaces or other rooms without natural ambient light. The artificial skylight described in WO2017048569 generally includes at least one light source, at least one first collimator, a prism sheet, and at least one transmissive material. The at least one first collimator is configured to collimate light from the at least one light source. The prism sheet is disposed adjacent to the at least one first collimator and is configured to reflect and refract collimated light received from the at least one first collimator. The at least one transmissive material is disposed adjacent to the prism sheet and is configured to radiate light diffusely.

Embodiments of the present invention seek to provide a new and alternative artificial skylight to the arrangement proposed in WO2017048569 which may, for example, provide an even more compact artificial skylight, and also improve the appearance of the artificial sky.

SUMMARY OF INVENTION

According to the first aspect of the present invention there is provided a collimating apparatus, comprising:
 a light source;
 a waveguide adjacent to the light source and configured to receive light from the light source;
 a light steering optic configured to receive light from the waveguide; and,
 a collimating optic configured to collimate light received from the light steering optic;
 wherein the waveguide and the collimating optic are physically located on a first side of the light steering optic; and
 wherein the light steering optic is configured to steer the light received from the waveguide towards the collimating optic.

Preferably the waveguide is a light pipe. Preferably the waveguide is tapered in shape. Preferably at least a portion of the light transmitted from the light source is captured by the waveguide, and subsequently propagates from the waveguide to the light steering optic, and then from the light steering optic to the collimating optic.

The light source may be a point source. The light source may be a hemispherically emitting light source (where light radiates in a hemisphere from the light source). The light source may radiate light normal to the emissive surface of the light source. The light source may be a Light Emitting Diode (LED).

The waveguide may be configured to reduce the divergence of the light beam received from the light source.

The waveguide may comprise a first, entrance, aperture proximal to the light source and configured to receive light from the light source. The waveguide may also comprise a second, exit, aperture distal to the light source and configured such that the light exits through the second aperture and travels to the light steering optic.

The waveguide may extend longitudinally away from the light source along an axis between the light source and the light steering optic. The width of the waveguide proximal to the light source may be smaller than the width of the waveguide distal to the light source. The width of the first aperture may be smaller than the width of the second aperture. That is, the second aperture may be larger (in diameter and/or area) than the first aperture. The waveguide may have any cross-sectional shape, such as circular or even an irregular polygon. In some embodiments, the diameter/area of the cross-section may fluctuate along the length of the waveguide, for example the diameter/area may increase and/or decrease along the length of the waveguide from the first to the second aperture. Preferably the cross-section increases steadily in diameter/area along the length of the waveguide from the first to the second aperture.

The waveguide may be constructed from any transparent material, such as glass or polymethyl methacrylate. The inner surface of the waveguide may be optically smooth. An inner surface of the waveguide may comprise a specularly reflective coating.

The light steering optic may be configured to reflect and/or refract the light. The light steering optic may be positioned proximal to the second aperture of the light pipe to receive light from the waveguide. The light may leave the light steering optic traveling in substantially the opposite direction to the received light. The light steering optic may steer/re-direct the path of the received light by an angle greater than 90 degrees, for example up to 180 degrees, such that the light is steered/re-directed towards the collimating optic.

The light steering optic may be part of or incorporated into the waveguide. The light steering optic may comprise a Porro prism. The Porro prism may be configured to receive light from the waveguide and redirect said light towards the collimating optic. The light steering optic may alternatively comprise a prism that, like a Porro prism, has at least two surfaces that use total internal reflection to bend the light towards the collimating optic.

In embodiments, the light steering optic may comprise only a mirror, for example when it is not necessary to steer the path of the received light through an angle approaching 180 degrees (such that it is traveling in substantially the opposite direction). In some embodiments, it may be required to steer the path of the received light through an angle approaching 180 degrees (such that the light is travelling in substantially the opposite direction). In said embodiments, the light steering optic may be comprised of several such mirrors. The mirrors may be arranged separately, or alternatively they may be joined together.

The light steering optic may comprise a specular reflector and a prism. The specular reflector may be a mirror. The collimating optic and the waveguide may be physically located on a first side of the prism. The specular reflector may be physically located on a second side of the prism. The second side of the prism may be substantially opposite to the first side of the prism. In use, the light may exit the waveguide and be refracted by the prism, such that the light then travels towards the specular reflector. The prism may then direct the light to the specular reflector. The specular reflector may then redirect the light back towards the collimating optic.

Preferably, the light steering optic may have a width sufficient to encompass the width of the light beam exiting the waveguide.

In some embodiments, the waveguide may be spaced apart from the collimating optic, such that the length of the waveguide may be contained within a distance from the collimating optic equal to the focal length of the collimating optic. The waveguide may preferably have substantially the same length as the focal length of the collimating optic.

The collimating optic may be a condenser lens. The condenser lens may be a Fresnel lens. The collimating optic may be a parabolic or a surface mirror. The condenser lens preferably controls the eventual disc diameter of the light beam.

The collimating apparatus may further comprise a straightening prism. The light exiting the collimating optic may subsequently pass through the straightening prism.

The collimating apparatus may further comprise a homogenising optical arrangement. The homogenising optical arrangement may extend substantially perpendicular to the collimated light exiting the collimating apparatus. The homogenising optical arrangement may be positioned to receive light from the collimating apparatus, in particular the collimating optic. The homogenising optical arrangement may extend across the width of the collimating apparatus. The light exiting the collimating apparatus may subsequently pass through the homogenising optical arrangement. The received light may have a non-uniform relative radiance profile. The homogenising optical arrangement may be configured such that light received from the collimating apparatus superimposes on exiting the homogenising prism set, and forms a flattened relative radiance profile. Relative radiance may be referred to herein as intensity.

In embodiments, the homogenising optical arrangement may be configured to split the light received from each collimating apparatus into two distinct light beams travelling in two different directions. After splitting the light, the homogenising optical arrangement may then realign the two distinct beams in substantially the same direction as the received collimated light beam. After realigning, any overlapping split beams may be superimposed to form the flattened relative radiance profile.

In an exemplary embodiment, the light exiting the collimating optic may be used as a virtual sun in an artificial skylight.

According to a second aspect of the present invention there is provided a collimating array comprising a plurality of collimating apparatuses as described with respect to the first aspect of the invention. The array may be one-dimensional or two-dimensional.

According to a third aspect of the present invention there is provided an artificial skylight comprising the collimating apparatus as described with respect to the first aspect of the invention, or comprising the array as described with respect to the second aspect of the invention.

According to a fourth aspect of the present invention there is provided a collimating array comprising a plurality of collimating apparatuses, each collimating apparatus comprising:

a light source;

a waveguide adjacent to a light source and configured to receive light from the light source, each waveguide being configured to reduce the divergence of the light received from the light source; and a collimating optic configured to collimate light received from the waveguide.

Preferably the waveguide is a tapered light pipe.

The features of the collimating apparatus of the fourth aspect of the invention are the same as the corresponding features described above with regards to the first aspect of the invention.

According to a fifth aspect of the present invention there is provided an artificial skylight comprising the collimating array as described in the fourth aspect of the invention.

Whilst the invention has been described above, it extends to any inventive combination set out above, or in the following description or drawings.

BRIEF DESCRIPTION OF THE DRAWINGS

The invention may be performed in various ways, and an embodiment thereof will now be described by way of example only, reference being made to the accompanying drawings, in which:

FIG. 1a shows the collimating apparatus incorporating a light steering optic in accordance with embodiments of a first aspect of the present invention;

FIG. 1c shows the FIG. 1a collimating apparatus with a parabolic mirror;

FIG. 2 shows the collimating apparatus incorporating a light steering optic in accordance with a further embodiment of the present invention;

FIG. 4a shows an array of collimating apparatuses incorporating a light steering optic according to embodiments of the first aspect of the present invention;

FIG. 4b shows an array of collimating apparatuses without a light steering optic in accordance with embodiments of a second aspect of the present invention;

FIG. 6b shows an array of collimating apparatuses according to the second aspect of the invention in use with a homogenising optical arrangement illustrating how light intensity is smoothed;

FIG. 6c illustrates why the resulting intensity profile of the light beam is parabolic after passing through a Fresnel lens;

FIG. 7 shows a homogenising optical arrangement for use with the collimating apparatus and having prismatic surfaces facing towards each other in accordance with embodiments of the present invention;

FIG. 8 shows a close up view of a homogenising optical arrangement having prismatic surfaces facing towards each other, and having an intermediate material in accordance with embodiments of the present invention;

FIG. 9a shows a homogenising optical arrangement for use with the collimating apparatus and having prismatic surfaces facing away from other in accordance with further embodiments of the present invention;

FIG. 9b is an enlarged view of the prismatic features of the FIG. 9a homogenising optical arrangement, showing the geometric relationship between an incident light ray and the prism surface; and, FIG. 9c shows a homogenising optical arrangement for use with the collimating apparatus and comprising a substrate with two prismatic surfaces.

DETAILED DESCRIPTION OF THE DRAWINGS

Figure 1B:
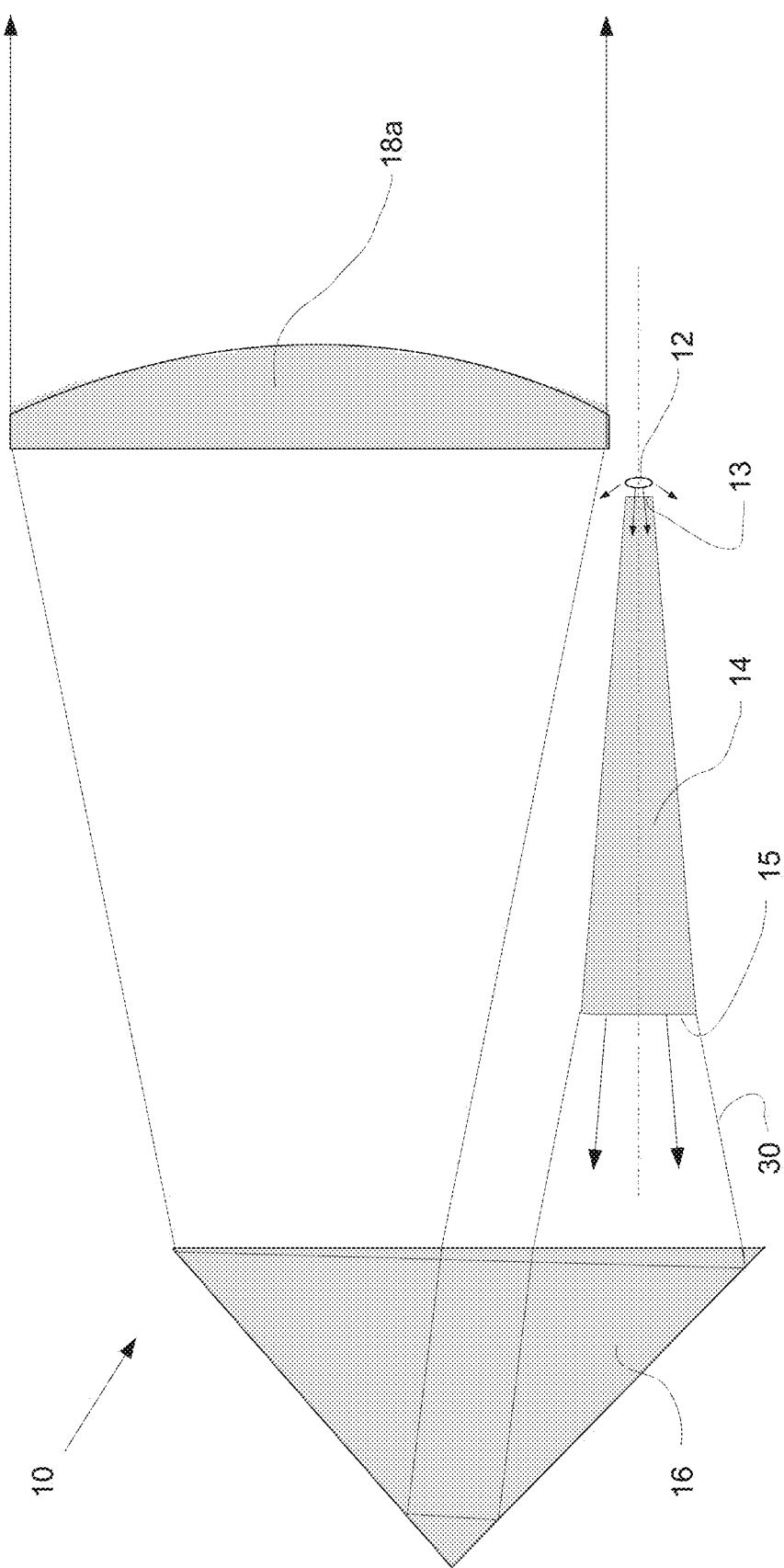
FIG. 1b shows the FIG. 1a collimating apparatus with a Fresnel lens.

FIGS. 1a, 1b and 1c show a collimating apparatus 10 having a light source 12 and a waveguide in the form of a tapered light pipe 14 adjacent to the light source 12 and configured to receive light from the light source 12. The collimating apparatus 10 also comprises a light steering optic 16 in the form of a Porro prism which is configured to receive light 30 from the tapered light pipe 14, and a collimating optic 18 which is configured to collimate light received from the Porro prism 16. The collimating optic 18 in FIG. 1a is depicted as two alternative embodiments 18a and 18b. In particular, the collimating optic could be a Fresnel lens 18a (shown in FIG. 1b) or alternatively a parabolic surface mirror 18b (shown in FIG. 1c).

The tapered light pipe 14 and the collimating optic 18 are both physically located on a first side A of the Porro prism 16. In use, the Porro prism 16 is configured to steer the light 30 received from the tapered light pipe 14 towards the collimating optic 18. In the embodiments shown in FIGS. 1a-c, the Porro prism 16 bends, that is primarily reflects, the light beam through an angle greater than 90 degrees, such as 180 degrees. An advantage of embodiments of the present invention may be that the act of folding/steering the light emitted from the light source allows the collimating apparatus to be contained within a small profile enclosure.

The light source 12 is a hemispherically emitting light source, in particular a Light Emitting Diode (LED). The LED is a small diameter light source such that it approximates a point source.

The tapered light pipe 14 extends longitudinally away from the light source 12 along an axis between the light source 12 and the Porro prism 16. The tapered light pipe 14 comprises a first aperture 13 which is proximal to the light source 12, and configured to receive light from the light source 12. The tapered light pipe 14 also comprises a second aperture 15 distal to the light source 12, and configured such that, in use, the light exits through the second aperture 15 and travels towards the Porro prism 16. The diameter of the first aperture 13 is smaller than the diameter of the second aperture 15. The Porro prism 16 is positioned proximal to, but spaced apart from, the second aperture 15 of the tapered light pipe 14.

The tapered light pipe 14 is smoothly tapered from the first to the second apertures 13, 15. Advantageously, such a design reduces the angular divergence of a beam exiting the tapered light pipe via the second aperture.

The tapered light pipe 14 may have a circular cross-section, although other shaped cross-sections can be used instead. The tapered light pipe 14 is constructed of any suitable transparent material, such as glass. In some embodiments, the first and second apertures 13, 15 may have an anti-reflective coating for improved light transmission.

The Porro prism 16 is made of any clear material generally considered suitable for optics, for example borosilicate glass (BK7 glass).

Figure 3:
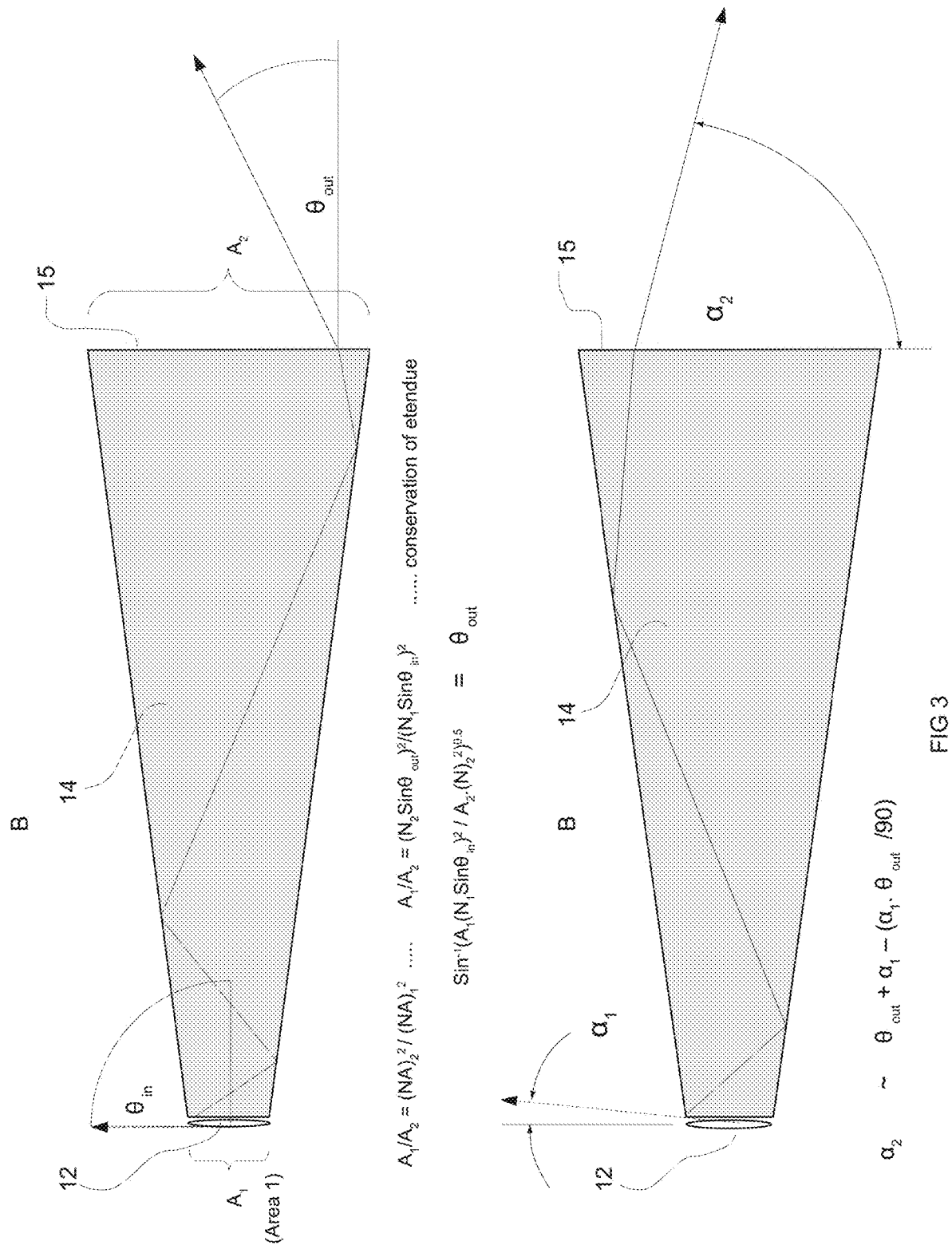
FIG. 3 is a more detailed view of a waveguide for use in the collimating apparatus of embodiments of the present invention, and the mathematical relationship between light entering an input aperture and exiting an output aperture.

The tapered light pipe 14 is configured to reduce the divergence of the light received from the LED 12. In particular, FIG. 3 shows the mathematical relationship between the first and second apertures 13, 15 and the degree to which light emitted from an LED positioned proximal to the first aperture 13 is converged (and also expanded) upon exiting the light pipe 14. An inevitable consequence of using the tapered light pipe 14 to reduce beam divergence, is that the beam diameter will increase due to the law of conservation of etendue.

The etendue of a light source is calculated by the area of the light source times the angle of the light beam it emits. In FIG. 3(A), the etendue at the first aperture 13 can be calculated using $A_1$ which is the area of the first aperture 13, and $\theta_{in}$ which is the angle of the light source perceived at the first aperture 13. The etendue at the second aperture 15 can also be calculated using $A_2$ which is the area of the second aperture 15, and $\theta_{out}$ which is the angle of the light source perceived at the second aperture 15. In an ideal optical system, etendue will be conserved. To conserve etendue in this example, a larger aperture must correspond to a smaller angle, and as such the light beam exiting the tapered light pipe is more converged than the light beam entering the tapered light pipe.

FIG. 3(B) shows the relationship between deviations $\alpha_1$ in the input angle $\theta_{in}$, and the resulting deviations $\alpha_2$ in the output angle $\theta_{out}$.

As shown in FIG. 1a, the collimating optic 18 can be a Fresnel lens 18a (see FIG. 1b and FIG. 2) or a parabolic surface mirror 18b (see FIG. 1c). The eventual diameter of the expanded light beam is controlled using the collimating optic 18.

Generally it is preferred to use lenses or mirrors with long focal lengths (and larger f-numbers) such that the resulting image, such as the virtual sun, is set close to or at infinity. Typically as the f-number of the lens/mirror increases, the ability of the collimating optic to set images at infinity is improved. In use, and as can be seen in each of FIGS. 1a-c and 2, the tapered light pipe 14 is located within the focal length of the Fresnel lens 18a or mirror 18b. Advantageously, this further improves the compactness of the apparatus. In embodiments, the tapered light pipe 14 is substantially the same length as the focal length of the collimating optic 18, whereby the shortest acceptable focal length is f/1. In general, the longer the tapered light pipe, the more ordered the exiting light beam.

FIG. 2 shows an alternative embodiment of the collimating apparatus 20 comprising a light steering optic in the form of a refractive prism 21a and mirror 21b. As before, the tapered light pipe 14 and collimating optic 18 are physically located on a first side A of the refractive prism 21a, and the mirror 21b is located on a second side B of the refractive prism 21a. The second side B of the refractive prism 21a is directly opposite the first side of the refractive prism 21a. The refractive prism 21a is positioned proximal to, but spaced apart from, the second aperture 15 of the tapered light pipe 14, and the mirror 21b is positioned further away, or distal, from the second aperture 15 of the tapered light pipe 14.

Similar to the Porro prism 16, the refractive prism 21a and mirror 21b are together configured to receive light 30 from the tapered light pipe 14 and steer the light towards the collimating optic 18a. In use, the light 30 exits the tapered light pipe 14 and passes through the prism 21a. The prism 21a then refracts the light such that the light is directed towards the mirror 21b, which then redirects the light back towards the collimating optic 18a. It will be apparent to the skilled person in the art that redirection of a light beam can be accomplished in a variety of ways, such as conventional mirrors inclined at an angle.

It may be an advantage of embodiments of the present invention that having a light steering optic, whether it be a Porro prism, a refractive prism and mirror, or any other suitable light steering apparatus, can help to conserve space, therefore allowing the collimating apparatus to be installed in small roof spaces.

The embodiment shown in FIG. 2 further comprises a straightening prism 24 and a diffusive reflector 25. In use, the straightening prism 24 receives light from the lens 18a, and has the function of steering the light towards the viewer, whilst expanding the visible area of the beam. A further function of the straightening prism 24 is to partially hide the optics and other structures located behind it that would otherwise be visible to a viewer. The straightening prism 24 achieves this by steering light that is incident at an angle other than the virtual sun beam angle, away from the viewer.

The diffusive reflector 25 provides additional space in which to house the tapered light pipe 14. Any stray light in the apparatus 20 (because of inevitable inefficiencies) will be partially recycled by the diffusive reflector 25. The proportion of light that would otherwise be wasted is partially returned and redirected back through the straightening prism 24 and out of the apparatus 20, thus contributing to the "sky" portion of the radiated light in the virtual skylight.

In use, because the light beam 30 reflects off the mirror 21b with an angle of reflection equal to the angle of incidence, the collimating lens 18b can be in some embodiments located at an angle (such as, approximately parallel or at a small angle) to the central axis of the tapered light pipe 14, as shown in FIG. 2 (instead of perpendicular as in FIGS. 1a-c), in order to intercept the full width of the reflected light beam to provide collimated light. Although in embodiments, the light beam can be reflected off the mirror at an angle of 180 degrees, or even slightly more, such that the collimating lens can be perpendicular to the central axis of the tapered light pipe to intercept the full width of the reflected light.

The collimated light is ultimately directed toward the straightening prism 24 which then steers the light towards the viewer, as described above.

Advantageously, embodiments having a collimating optic positioned at an angle to the central axis of the tapered light pipe, can help to make the collimating apparatus smaller in depth, and thus even more compact.

The position of the Porro prism 16 of the FIG. 1a-c embodiment, and the refractive prism 21a of the FIG. 2 embodiment, is such that not only does their width substantially capture the width of the light beam 30 exiting the tapered light pipe 14, but they are also positioned such that the captured light beam can be substantially steered towards the collimating optic 18.

The light source 12, tapered light pipe 14, light steering optic 16, or 21a and 21b, and collimating optic 18 together form the collimating apparatus 10, or 20. Any number of collimating apparatuses 10 or 20 can be arranged in an array 41a, such as a contiguous one-dimensional array, as shown in FIG. 4a. Such a one-dimensional, or linear, array 41a of collimating apparatuses 10 or 20 is typically used in an artificial skylight. As mentioned previously, the artificial skylight only requires a relatively shallow enclosure 42a given the folding of the light path. For example, the enclosure 42a may be around 350 mm deep.

Advantageously, as shown in FIG. 4a, the one-dimensional array 41a of collimating apparatuses 10 can be used to create shallow, large aperture beam collimators which can be used to enhance the performance of an artificial skylight by capturing almost all the light from an array of LEDs 12, and through beam expansion (using the tapered light pipe 14) and collimation (using the collimating optic 18a or 18b), provide a collimated output that can be used as a virtual sun in an artificial skylight. A cross-sectional area of the collimated beam 44a has a length 41a which is equal to the length of the array, and a height d equal to the aperture diameter of a single collimating lens 18a.

In embodiments of other aspects of the invention, the act of arraying light emitting units can in itself accomplish compactness. The light steering optic 16, or 21a and 21b, may therefore be deemed unnecessary, and thus omitted from collimating apparatus 40, as shown in FIG. 4b. An array 41b of light emitting units 40 comprising collimating lenses 18a or reflectors 18b acts similar to a "fly's eye lens" with a shallow focal length and a wide field-of-view. Such an array 41b can produce a full aperture beam 44b via collimation of multiple sources. However, the presence of a light steering optic 16, or 21a and 21b, is preferred as this adds an additional level of compactness, as can be seen by comparing the required enclosure sizes 42a and 42b.

In use, collimating apparatuses 10 are firstly arranged as shown in FIG. 4a. Each collimating apparatus 10 in the array 41a is as described above with respect to the FIG. 1b embodiment.

Each LED 12 is then switched on to create a small source of hemispherical light. The light rays are transmitted into the first aperture 13 of the tapered light pipe 14. The length of the tapered light pipe 14 is sufficient to allow the light beam to be adequately expanded as the light travels along its length in accordance with the law of conservation of etendue. The length of the tapered light pipe 14 is also long enough to reduce the divergence angle of the light rays every time they undergo reflection.

When the light beam exits the tapered light pipe 14 through the second aperture 15, the beam is wider in diameter but more focussed than the light rays entering the tapered light pipe. In the case of a tapered light pipe with a first aperture 13 having a diameter of 3 mm and a second aperture having a diameter of 12 mm (and assuming a hemispherically radiating light source), light will exit the tapered light pipe in the form of a light cone and will also be constrained to a divergence angle of approximately 29 degrees (subtended), that is 0.214 steradians. Reflection occurs by way of total internal reflection, but in some embodiments it can be produced by application of a specularly reflective coating to the inner surface of the tapered light pipe.

After the expanded light rays exit the tapered light pipe 14, they travel towards the Porro prism 16. A lower portion of the Porro prism 16 is wide enough to encompass the width of the expanded light beam exiting the tapered light pipe 14. Advantageously this helps to conserve light efficiency.

The Porro prism 16 refracts the light received from the tapered light pipe 14, such that the light leaving the Porro prism 16 is travelling in the opposite direction to the received light. Ideally, as shown in FIG. 1a, the light exits through an upper portion of the Porro prism 16. As the light beam travels away from the Porro prism 16, it expands even further.

The Fresnel lens 18a is located at the point where the diagonal distance of the lens is substantially equal to the diameter of the light beam. As the light rays pass through the Fresnel lens, they are again refracted, but this time the light rays converge and are collimated, such that the beam stops expanding and wide-beam parallel light is produced. Ultimately, the light beam exits the collimating apparatus as a substantially collimated beam of light.

Figure 5:
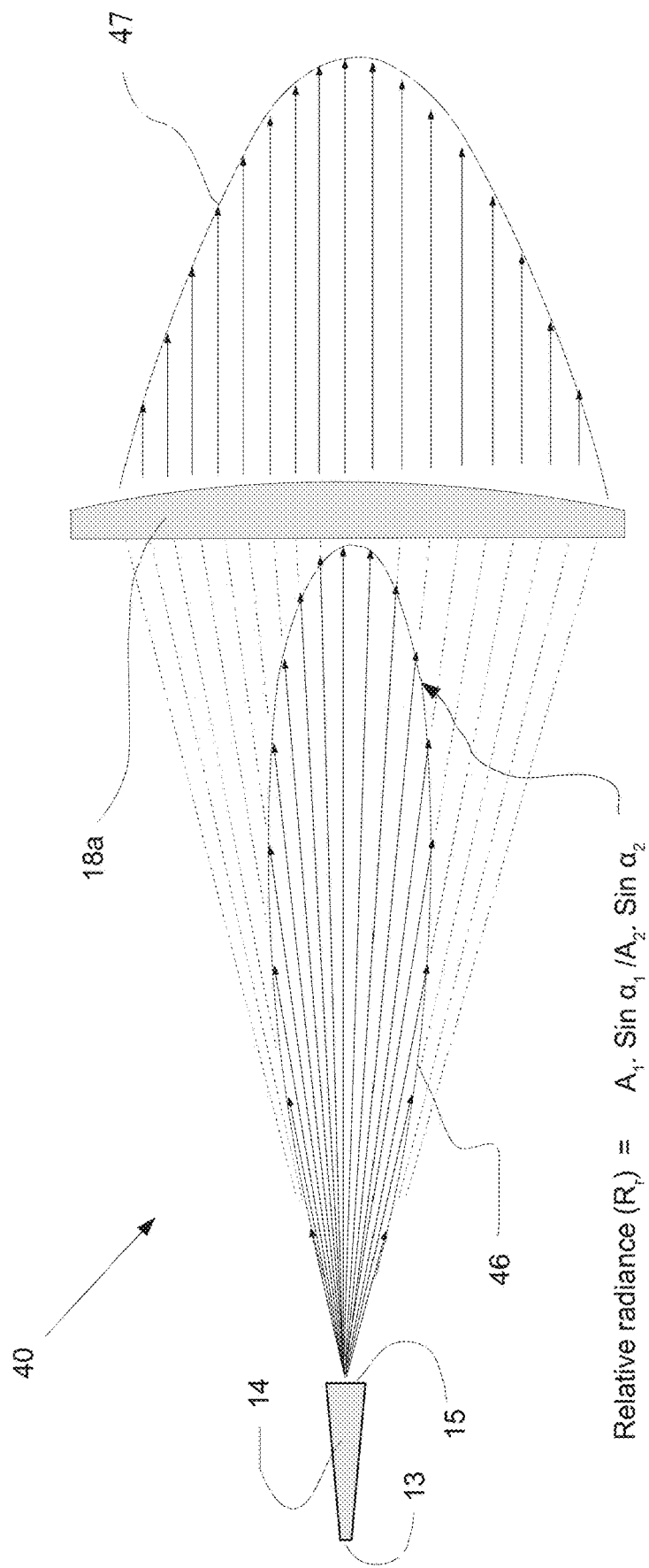
FIG. 5 shows the intensity profile of a light beam exiting the waveguide in accordance with embodiments of the second aspect of the invention.

FIG. 5 shows the resulting intensity profile of the light beam (i.e., the relative radiance profile of the light beam) before 46 and after 47 passing through the collimating lens 18a of unit 40, but the same intensity profile is found when collimating apparatus 10 (with the light steering optic) is used instead. That is, regardless of whether or not the light beam passes through a light steering optic (such as the Porro prism), the intensity profile (that is, the relative radiance profile) will be the same. One problem that will arise from arranging the collimating apparatuses 10 or 40 into a contiguous one-dimensional array 41a or 41b, is that the resulting beam of light 44a or 44b will appear to have an uneven intensity profile 46 due to bright spots associated with each tapered light pipe 14.

The relationship between the first aperture 13 having area $A_1$, the second aperture 15 having area $A_2$, and beam intensity $I_1$ (and assuming that the LED 12 is of equal cross-sectional size to first aperture 13) is:

$$I_1 = \frac{A_1 \sin\alpha_1}{A_2 \sin\alpha_2}$$

wherein the intensity $I_1$ is defined as the relative radiance, $\alpha_1$ is the deviation in the input angle $\theta_{in}$, and $\alpha_2$ is the resulting deviation in the output angle $\theta_{out}$ (as shown in FIGS. 3(A) and 3(B)).

The equation for $I_1$ shows that the intensity (relative radiance) profile 46 of the beam exiting the tapered light pipe 14, will be parabolic in shape and have a "hot spot", or a particularly bright region, in and around the central area of the beam. Likewise, the intensity (relative radiance) profile 47 of the beam exiting the collimating lens 18b will also be parabolic in shape and have a "hot spot" near the centre of the exiting beam. As shown in FIG. 6c, the reason for the parabolic shape is due to the elliptical profile of the light exiting the light pipe being redirected and consequently transformed by the collimating lens. The elliptical profile of the light exiting the light pipe is best described by Lambert's cosine rule.

FIGS. 4a and 4b show that the resulting intensity profile 47 of the collimated light beam will be non-uniform, and will comprise a series of high amplitude peaks and troughs along the array 41a or 41b. The intensity profile 47 has the appearance of a half sinusoidal wave pattern. The intensity of the collimated light beam $I_2$ must therefore be evened out, or flattened, to prevent these "hot spots". One way around this problem is to homogenise the exiting beam using a homogenising optical arrangement, such as a homogenising prism set 50 as shown in FIGS. 6a and 6b.

The homogenising prism set 50 is spaced apart from the collimating lens 18a and extends across the width of the array 41a, that is it extends across the width of each collimating apparatus 10. The homogenising prism set 50 comprises a first prism sheet 51 and a second prism sheet 52. The first prism sheet 51 is located closest to the collimating lenses 18a, and the second prism sheet 52 is located furthest away from the collimating lenses 18a.

Figure 6A:
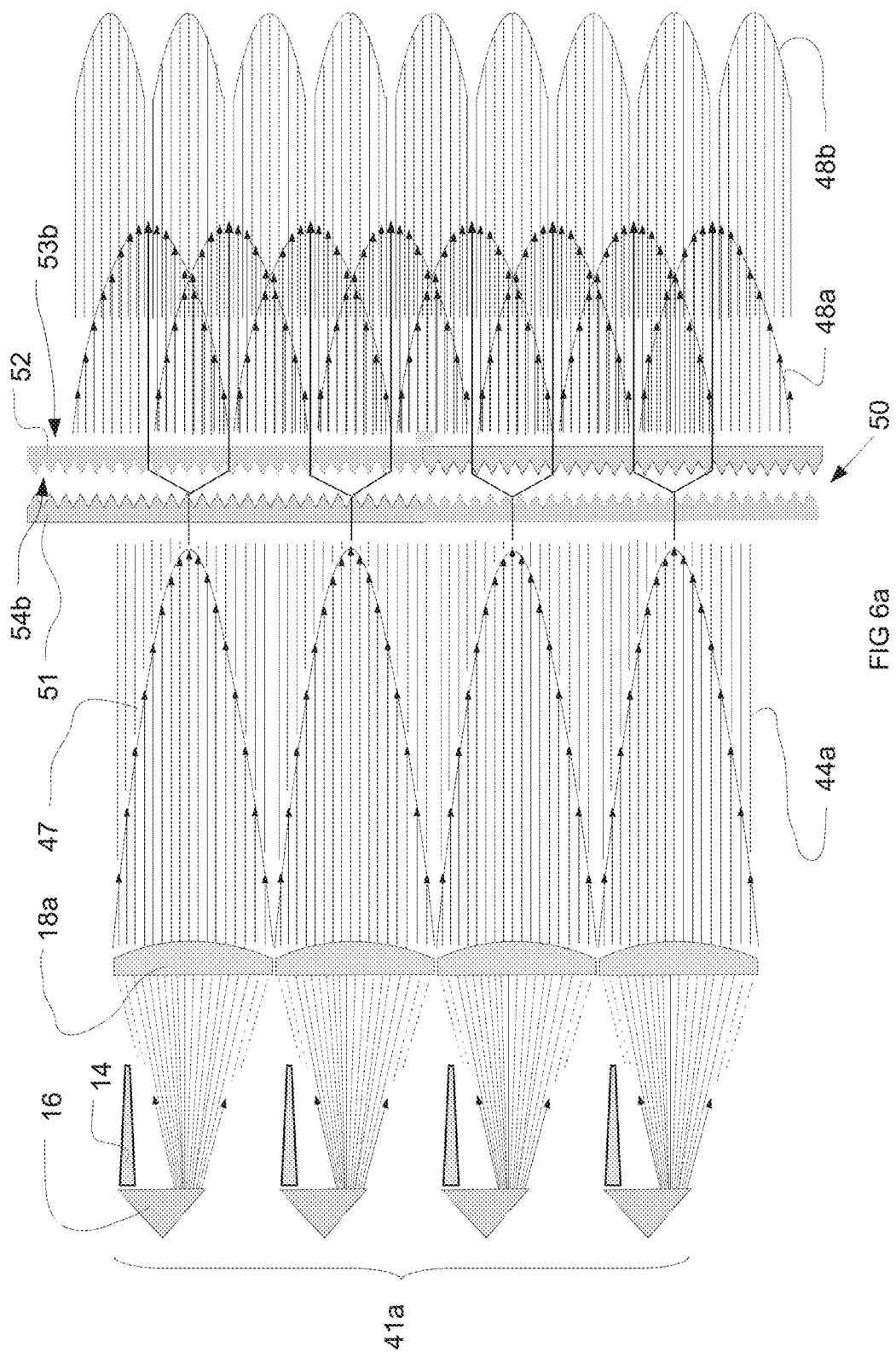
FIG. 6a shows an array of collimating apparatuses according to the first aspect of the invention in use with a homogenising optical arrangement illustrating how light intensity is smoothed.

Although FIG. 6a shows an embodiment comprising collimating apparatuses 10, the homogenising prism set can also be combined with embodiments comprising collimating apparatuses 40, that is without the light steering optic (without any folding of the light path), as is shown in FIG. 6b. Furthermore, the homogenising prism set can also be combined with embodiments comprising collimating apparatuses 20, that is with a collimating optic in the form of a refractive prism 21a and mirror 21b.

Prism sheet 51 comprises a planar surface 53a and a prismatic surface 54a, and prism sheet 52 comprises a planar surface 53b and a prismatic surface 54b.

As shown in FIG. 7, prismatic surface 54a comprises a plurality of symmetrical facets 55a and 55b. Prismatic surface 54b comprises a plurality of symmetrical facets 56a and 56b. Each pair of facets 55a, 55b and 56a, 56b is equilateral, such that the inclusive angle between each pair of facets 55a, 55b and 56a, 56b is around 60 degrees.

In the embodiment shown in FIGS. 6 and 7, prismatic surfaces 54a and 54b are oriented such that they are facing towards each other. In such embodiments, in use, a light beam normally incident on the planar surface 53a totally internally reflects off facet 55a of the first prismatic sheet 51 at an angle of around 60 degrees to the normal. The light beam then exits facet 55b of the first prismatic sheet 51 undeviated, that is at the same 60 degree angle. The light beam then incidents facet 56a of the second prism sheet 52, whereupon the process is reversed and the light beam exits planar surface 53b at an angle normal to its planar side, thus realigning the light beam in the same direction as the light beam initially entering the homogenising prism set 50.

In use, the light exiting the collimating lens 18a having a non-uniform and parabolic intensity profile subsequently passes through the homogenising prism set 50. This light is first received normally incident to the first prism sheet 51 which refracts the light and causes the collimated light beam to split into two equal but separate light beams 49a and 49b. The two distinct light beams 49a and 49b exit the first prism sheet 51 travelling in different directions, and then enter the second prism sheet 52 which refracts each of the split light beams 49a and 49b, and causes them to assume their original direction prior to splitting. The realigned light beams 49a and 49b exit normally to planar surface 53b, but the light beams are now separated in distance.

As a result, the parabolic intensity distribution 48a of each separated light beam will overlap. Each overlapping light beam is superimposed to form a homogenised light beam 48b having a flattened or averaged intensity profile, and the intensity of any "hot spots" is reduced or nullified.

The flattened intensity profile 48b exiting the homogenising prism set 50 comprises a half-sinusoidal wave pattern of relatively lower amplitude peaks and troughs, compared to the intensity profile 47 of the collimated light beam, as is shown in FIGS. 6a and 6b. As can further be seen in FIGS.

6a and 6b, intensity profile of the homogenised light beam 48b has double the frequency of the intensity profile 47 of the collimated light beam.

Any light beams 45 not normally incident on the planar surface 53a may exit facet 55b, and then re-enter the first prism sheet 51 at facet 55a causing the light to scatter, leading to chromatic artefacts. Similarly, light beams that miss facet 56a will instead totally internally reflect off the planar face 53b causing them to incident off prism facets 56a and 56b leading to chromatic separation, an unwelcome artefact. To reduce or avoid this problem, a third prism sheet 60 is provided adjacent to the first prism sheet 51, as shown in FIG. 8, between the first prism sheet 51 and the second prism sheet 52, and is made of the same material as the first prism sheet 51. Due to the inclusive angle between prism facets 65 and 66 being less than 60 degrees, rays 49a and 49b will miss facets 65 and 66 (a geometric axiom) by a small distance 157 thereby eliminating the scattering 45a present in FIG. 7 within the first prism sheet 51. Similarly, rays 49a and 49b will always strike prism facets within prism sheet 52 provided their inclusive angle is greater than 60 degrees thereby preventing rays from striking the planar face of 53b of prism sheet 52 and in so doing, eliminating rays 45b present in FIG. 7 that would otherwise totally internally reflect off planar face 53b and subsequently undergo chromatic separation.

Similar to the first and second prism sheets 51, 52, the third prism sheet 60 comprises a plurality of facets 65, 66. The facets 65, 66 of the third prism sheet 60, and the facets 55a, 55b of the first prism sheet 51 interlock in use. However, a small air gap 61 is maintained between the first and third prism sheets 51, 60 when the facets of the first and third prism sheets 55a, 55b and 65, 66 are interlocked. The air gap 61 helps to prevent the uncoupling of incident light via evanescent wave interaction. In embodiments, there is no air gap, and the first and third prism sheets 51, 60 are in direct contact.

The third prism sheet 60 has a higher refractive index than air, but a lower refractive index than the first prism sheet 51. Thus, the third prism sheet 60 influences (refracts) the direction of the light beam during use.

Due to the inclusive angle of the facets 55a, 55b of the first prism sheet being less than 60 degrees, and the third prism sheet 60 influencing the direction of light wave propagation, it is necessary for facets 56a, 56b of the second prism sheet 52 to have an inclusive angle greater than 60 degrees to reinstate the direction of the light beam such that the light beam exits normal to the planar surface 53b of said second prism sheet 52.

In some other embodiments, prism facets 55a, 55b of the first prism sheet 51 can be in direct contact with a material of lower refractive index (but higher than air) such that the two are optically coupled. However, in this situation the refractive index of the material must be carefully selected so as not to allow uncoupling of the light from facet 55a of the first prism sheet 51.

In use, after the split light beams 49a and 49b exit the first prism sheet 51 they pass through the air gap 61 and into the third prism sheet 60. The third prism sheet 60 refracts the light as it enters the third prism sheet 60 and again as it exits. As before, the light beam then enters the second prism sheet 52 which refracts each of the split light beams 49a and 49b, and causes them to assume their original direction prior to splitting. The split light beams then superimpose to form a homogenised light beam with minimal or no chromatic artefacts.

It has been found that the three prism arrangement described above works best for monochromatic sources due to the high degree of refraction experienced by the beam 49b.

FIGS. 9a and 9b show a further embodiment of the homogenising prism set 150, where the prismatic surface 154a of the first prism sheet 151 and the prismatic surface 154b of the second prism sheet 152 are oriented away from each other. The third prism sheet described above in FIG. 8, can also be provided in embodiments where the prismatic surfaces face away from each other.

In use, this embodiment receives light through facet 155b of the first prism sheet 151 at an angle Ω from the normal to facet 155b (as seen in the lower right hand prism of FIG. 9a, and also FIG. 9b). Angle Ω is the angle which causes the received light to be refracted such that it propagates through the first prism sheet 151 parallel to facet 155a. In this case, the light beam is refracted such that it propagates parallel to adjoining facet 155a until it exits the planar surface 153a of the first prism sheet 151 and enters the planar surface 153b of the second prism sheet 152. The light beam is then refracted upon entry to the second prism sheet 152, and the original direction of the light beam, which is approximately normal to the planar surface 153a and 153b of both prisms 151 and 152, is reinstated as it passes through facet 156a of the second prism sheet 152.

In this embodiment, the light beam is split in a similar way as described above in FIGS. 7 and 8. After splitting the light beam, the collimated light is first refracted from separate areas on prism sheet 151, and is then merged by the second prism sheet 152.

As demonstrated in FIG. 9a, a collimated light beam passing through the first prism sheet 151 is split into two equal but separate light beams 149a and 149b on exiting the first prism sheet 151. The two discrete light beams 149a and 149b travel in different directions, and then enter the second prism sheet 152 which refracts each of the split light beams 149a and 149b, and causes them to assume their original direction. The realigned light beams 149a and 149b then exit the second prism sheet 152 but are now spatially separated. The split light beams 149a and 149b can then be superimposed, in the same way as described previously, to form a homogenised light beam having a flattened or averaged intensity profile, such that the intensity of any "hot spots" is reduced or nullified.

As shown in FIG. 9a, $R_1$ and $R_2$ represent the two outermost light rays contained within a ray bundle, having a divergence angle δ. Any light entering the first prism sheet 151 that deviates slightly from Ω and incidences facets 155a and/or 155b in the process, will totally internally reflect off said facets at an angle $R_1$ (as seen in the lower left hand prism of FIG. 9a). Assuming deviation from Ω to be symmetrical about a central ray Ÿ which is precisely normal to planar surface 153a of the first prism sheet 151 (see FIG. 9b), then, for small angles $R_1$ is approximately equal to $R_2$, thus beam divergence is still 6 and there are no stray light rays Therefore, the divergence angle δ of the incident light (shown in the lower left hand prism of FIG. 9a) does not increase and etendue is conserved.

Similarly, when light incidences the prismatic surface 154b of the second prism sheet 152, the opposite occurs. Light beams striking facet 156b of the second prism sheet 152 will still remain within the divergence angle δ of the incident light.

To ensure that any light rays which totally internally reflect off facets 155a and/or 155b of the first prism sheet 151 remain within the divergence angle δ of the incident light, the central ray Ÿ shown in FIG. 9b must, upon refraction, propagate parallel to at least one of the facets 155a or 155b. FIG. 9b shows the central ray Ÿ incident to facet 155b, refracting, and then propagating parallel to facet 155a. For this to occur, the following relationship between incident light and prismatic surface 154a exists:

$$\theta = \Omega - \beta,$$

where $\Omega$ is the angle between the incident central ray Ÿ and the normal to facet 155b, $\beta$ is half the inclusive angle between facets 155a and 155b, and $\theta$ is the angle between the refracted central ray Ÿ and the normal to facet 155b. Using Snell's Law, we obtain the equation:

$$\frac{n_1}{n_2} = \frac{\cos 2\beta}{\cos \beta}$$

where $n_1$ and $n_2$ are the refractive index of air and the first prismatic sheet respectively.

Taking this one step further, in some examples, the first prism sheet is made of acrylic, which has a refractive index $n_2$ of 1.492. Solving for $\beta$ we then obtain, $\beta = \text{Arccos } 0.89 = 27°$.

Since the inclusive angle of the facets is $2\beta$, the inclusive angle will therefore be 54 degrees. This means that for a refractive index of 1.492, the inclusive angle must be 54 degrees for any totally internally reflecting light to remain within the divergence angle $\delta$.

FIG. 9c shows a further embodiment of the homogenising optical arrangement 250 comprising a substrate 258. The first and second prismatic surfaces 254a and 254b are located on a first and second side of the substrate 258 respectively, and face away from each other. Such a prism may be referred to as a dual faceted homogenising prism. In use, only one such substrate is required to homogenise a collimated light beam.

The light beam is once again split in a similar way as described above for FIGS. 7, 8, and 9a. However, in this embodiment, the single substrate 258 performs the functions of splitting the incident light beam into two distinct light beams which travel in different directions, and then realigning the two light beams such that they assume their original direction upon exiting the substrate 258. The realigned light beams are now spatially separated, and can be superimposed, in the same way as described previously, to form a homogenised light beam having a flattened or averaged intensity profile, such that the intensity of any "hot spots" is reduced or nullified.

Overall, an advantage of the invention may be that it not only provides a means of producing substantially collimated light from a large aperture device housed within a shallow enclosure, for example an enclosure that is no deeper than the focal length of the collimating optic; it also provides a means of efficiently collimating light harnessed from a small diameter, hemispherically emitting light source. In some embodiments, collimating apparatuses can be nearly seamlessly combined in a contiguous one-dimensional array, without the presence of "hot spots" and shadows.

Although the invention has been described above with reference to an exemplary embodiment, it will be appreciated that various changes or modifications may be made without departing from the scope of the invention as defined in the appended claims.

For example, embodiments of the homogenising optical arrangement as described herein can also be used in non-optimised collimating systems, that is systems that rely on inefficient light harnessing techniques to constrain the light cone from an LED (such as where a suboptimal optic is used instead of a light pipe). Inefficient light harnessing techniques can result in a significant portion of the light from a hemispherically emitting LED to expand beyond a given lens aperture, thus increasing etendue. Although inefficient, such non-optimised collimating systems may be used where it is necessary to reduce component costs, and so simpler and less expensive light harnessing optics may be favoured.

Furthermore, the homogenising optical arrangement can also be used in applications where the light from an LED is collimated without any intermediate light harnessing optics whatsoever (as shown in FIG. 6b). However, as described above, the homogenising optical arrangement will average out the series of high amplitude peaks and troughs defining the relative radiance profile of the non-uniform collimated light beam (particularly evident where Fresnel lenses are used as the collimating optic) by superimposing adjacent beams.

The invention claimed is:

1. A collimating apparatus, comprising:
   a light source;
   a waveguide adjacent to the light source and configured to receive light from the light source, the waveguide being further configured to reduce the divergence of the light received from the light source;
   a light steering optic configured to receive light from the waveguide; and,
   a collimating optic configured to collimate light received from the light steering optic;
   wherein the waveguide and the collimating optic are both physically located on a first side of the light steering optic;
   wherein the light steering optic is configured to steer the light received from the waveguide towards the collimating optic; and,
   wherein the waveguide comprises a first aperture proximal to the light source and configured to receive light from the light source, and an opposing second aperture distal to the light source and configured such that the light exits through the second aperture and travels to the light steering optic;
   wherein the waveguide is tapered, such that a diameter of the first aperture is smaller than a diameter of the second aperture, and wherein the cross-section of the waveguide increased steadily in diameter/area along the length of the waveguide from the first aperture to the second aperture.

2. The collimating apparatus of claim 1, wherein the waveguide is a light pipe.

3. The collimating apparatus of claim 1, wherein at least a portion of the light transmitted from the light source is captured by the waveguide, and subsequently propagates from the waveguide to the light steering optic, and then from the light steering optic to the collimating optic.

4. The collimating apparatus of claim 1, wherein the light source is a point source.

5. The collimating apparatus of claim 1, wherein the inner surface of the waveguide is optically smooth.

6. The collimating apparatus of claim 1, wherein an inner surface of the waveguide comprises a specularly reflective coating.

7. The collimating apparatus of claim 1, wherein the light steering optic comprises a Porro prism, the Porro prism configured to receive light from the waveguide and redirect said light towards the collimating optic.

8. The collimating apparatus of claim 1, wherein the light steering optic comprises a specular reflector and a prism, and wherein the collimating optic and the waveguide are physically located on a first side of the prism, and the specular reflector is physically located on a second side of the prism, the second side of the prism being opposite to the first side of the prism.

9. The collimating apparatus of claim 8, wherein the light exits the waveguide and passes through the prism, the prism directing the light to the specular reflector, and whereby the specular reflector redirects the light towards the collimating optic.

10. The collimating apparatus of claim 1, wherein the light steering optic re-directs the path of the received light by an angle greater than 90 degrees, such that the light is re-directed towards the collimating optic.

11. The collimating apparatus of claim 1, wherein the waveguide is spaced apart from the collimating optic, such that the length of the waveguide may be contained within a distance from the collimating optic equal to the focal length of the collimating optic.

12. The collimating apparatus of claim 1, wherein the waveguide has substantially the same length as the focal length of the collimating optic.

13. The collimating apparatus of claim 1, wherein the collimating optic is a condenser lens.

14. The collimating apparatus of claim 13, wherein the condenser lens is a Fresnel lens.

15. The collimating apparatus of claim 1, wherein the collimating optic is a parabolic or surface mirror.

16. The collimating apparatus of claim 1, further comprising a straightening prism, wherein the light exiting the collimating optic subsequently passes through the straightening prism.

17. The collimating apparatus of claim 1, further comprising a homogenising optical arrangement, wherein the homogenising optical arrangement extends substantially perpendicular to the collimated light exiting the collimating apparatus, such that the light exiting the collimating apparatus in use subsequently passes through the homogenising optical arrangement.

* * * * *